UNITED STATES PATENT OFFICE.

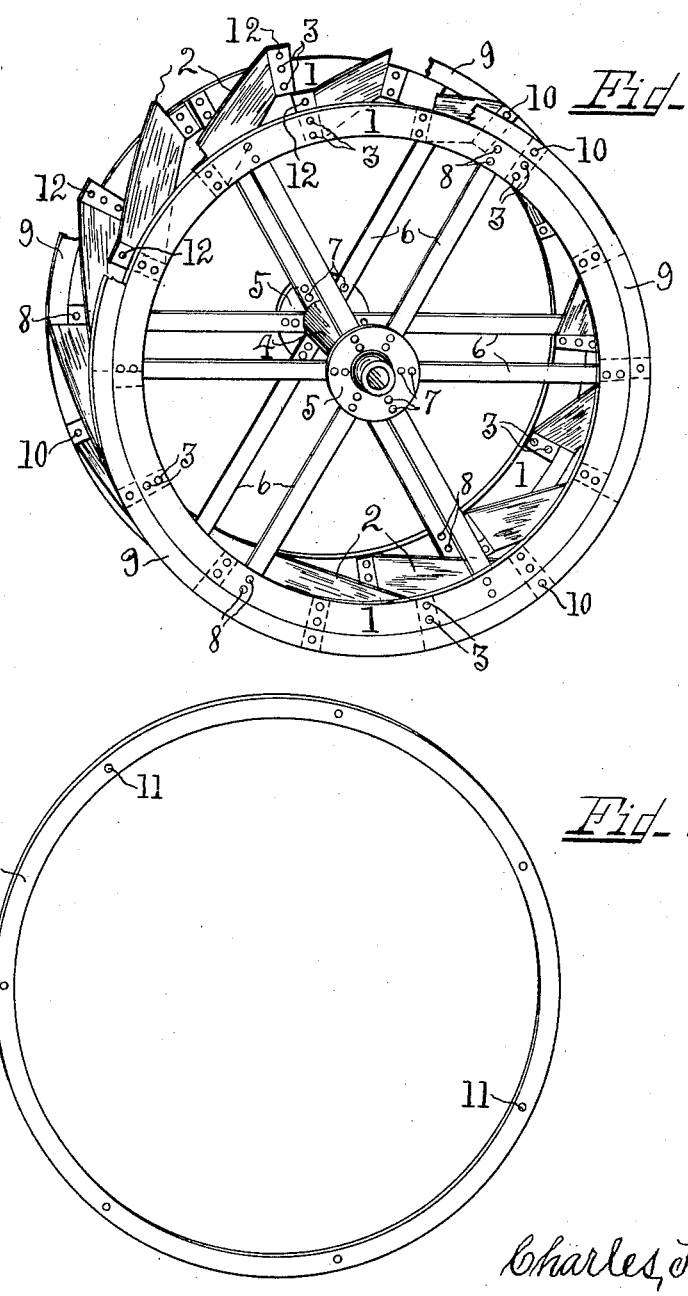

CHARLES H. FURCHE, OF SHERMAN, TEXAS.

TRACTOR-WHEEL.

1,357,395. Specification of Letters Patent. Patented Nov. 2, 1920.

Application filed February 13, 1920. Serial No. 358,372.

*To all whom it may concern:*

Be it known that I, CHARLES H. FURCHE, a citizen of the United States, residing at Sherman, in the county of Grayson and State of Texas, have invented certain new and useful Improvements in Tractor-Wheels, of which the following is a specification.

This invention relates to certain new and useful improvements in tractor-wheels, and is designed particularly to improve the type of wheel heretofore invented by me embodied in an application for patent, filed January 20th, 1920, Serial Number 352,682. In common with the wheel embodied in the application above named, the present wheel may be used on traction-engines of different kinds for road work, operating gang plows in farming operations, and for all purposes for which traction-engines can be employed. In its use in either connection, I have found that the successful operation of a traction wheel depends to a very large extent on the regulation of the cleats or lugs to suit hard or soft soil. In my pending application, above named, I have shown two metal rings spaced apart and connected by diagonal bars flush with their outer circumference, which construction is suited to sandy or soft land; but to accomplish the best results on hard ground the cleats or lugs should have greater penetration therein, and to this end the principal aim of the present invention is to overcome the inherent objection of cleats or lugs arranged permanently flush with the outer circumference of their supporting rings, and the invention comprises a series of diagonal bars that extend beyond the outer circumference of the rings to which they are secured, and also of attachable auxiliary rings circumferentially positioned aroung the rings aforesaid, and of a width equal to the projection given the diagonal bars. When the auxiliary rings are attached, a wheel adapted for use on sandy or soft land is provided, and when detached the diagonal cleats will have greater penetration in hard soil.

In the accompanying drawing, Figure 1, is a perspective view of a wheel of the type described constructed according to my present invention, a portion of the attachable rings being broken away; and Fig. 2 is a view showing one of the attachable rings.

Referring to the drawing, it will be observed that the permanent rim of the wheel comprises two rings 1, formed of flat bar iron or steel of considerable width, and curved edgewise to the desired circle. They are spaced apart as shown and connected at regular intervals by a series of diagonally disposed transverse bars 2, formed of metal the same thickness but of greater width than that of the rings, and attached thereto by rivets 3; said bars and rings together forming the permanent wheel-tread. The hub 4 of the wheel may be approximately of the usual form, with a circular flange 5 near each end, to which one end of a series of spokes 6 are secured by rivets 7; the radially extended spoke ends being secured to the rings 1, by rivets 8.

As previously mentioned, added width has been given the bars 2, but their inner edges remain flush with the inner circumference of the rings 1, their outer edges being extended above the rings as shown in Fig. 1, and with these features only employed, the projections provide a wheel admirably adapted for use on hard land. Rings 9, having an inner circumference adapted to loosely encircle the outer circumference of the rings 1, and a width equal to the projection of the bars 2 above the rings 1, may be secured in position on the wheel by bolts 10 extending through apertures 11 in the rings, and through apertures 12 in the cleats 2. When thus equipped with these auxiliary rings the wheel practically embodies the desirable features set forth in my former application, more bearing surface being added to the tread of the wheel, adapting it for use on soft ground, also with no projecting lugs or cleats it is obvious that the engine thus equipped will pass over hard ground or paved streets without jolt and consequent injury to the parts.

In conclusion it may be stated that the projection of the cleats 2 above the rings 1 is usually approximately an inch and a half, these distances, however, may be advantageously varied within certain narrow limits, according to the locality, also character of the soil on which the wheels are to be used.

Having thus described my invention, what I claim as new and desire to secure by Letters Patent, is—

In a tractor wheel, the combination of a hub, a permanent and an attachable tread portion, and connecting means between the hub and said portions, the permanent tread portion comprising a pair of annular rings arranged in spaced relation by transverse bars extending diagonally from one to the other and beyond their outer circumference, the auxiliary tread portion comprising rings adapted to loosely encircle the outer circumference of the first mentioned rings, and means rigidly securing all of the parts in their respective positions.

In testimony whereof I affix my signature.

CHARLES H. FURCHE.